United States Patent

Bohner et al.

[11] Patent Number: 5,845,736
[45] Date of Patent: Dec. 8, 1998

[54] POWER STEERING FOR MOTOR VEHICLES

[75] Inventors: Hubert Bohner, Böblingen; Martin Moser, Fellbach, both of Germany

[73] Assignee: Mercedes-Benz AG, Stuttgart, Germany

[21] Appl. No.: 744,840

[22] Filed: Nov. 8, 1996

[30] Foreign Application Priority Data

Nov. 9, 1995 [DE] Germany .................. 195 41 749.6

[51] Int. Cl.[6] .................. B62D 5/04; B62D 5/09
[52] U.S. Cl. .................. 180/403; 180/405; 91/363 A; 91/363 R; 91/367
[58] Field of Search .................. 180/402, 403, 180/405, 406, 407, 422; 91/367, 363 A, 363 R, 361

[56] References Cited

U.S. PATENT DOCUMENTS

| 4,733,878 | 3/1988 | Kanazawa et al. | |
|---|---|---|---|
| 5,080,186 | 1/1992 | Elser et al. | 180/142 |
| 5,135,069 | 8/1992 | Hattori et al. | 180/422 |
| 5,156,229 | 10/1992 | Yasui et al. | 180/402 |
| 5,159,553 | 10/1992 | Karnopp et al. | 180/402 |
| 5,172,785 | 12/1992 | Takahashi | 180/402 |
| 5,253,729 | 10/1993 | Suzuki | 180/422 |

FOREIGN PATENT DOCUMENTS

| 39 18 897 | 12/1989 | Germany . |
| 43 30 338 | 9/1994 | Germany . |

Primary Examiner—Brian L. Johnson
Assistant Examiner—William R. Zimmerli
Attorney, Agent, or Firm—K. Bach

[57] ABSTRACT

In a hydraulic power steering for motor vehicles having a steering control element, a position setting unit connected to the steering control element, a control motor connected to the position setting unit by way of a control circuit and a servo valve having control parts which are supported so as to be rotatable relative to each other but operatively interconnected by spring means retaining them in a central open position relative to each other, one of the control parts is operatively connected to the control motor and the other is connected to a steering gear mechanism associated with the steered wheels of the motor vehicle, and a hydraulic servomotor is associated with the vehicle wheel steering mechanism and hydraulically connected to the servo valve to receive hydraulic fluid therefrom depending on the relative rotary positions of the servo valve control parts.

4 Claims, 3 Drawing Sheets

5,845,736

POWER STEERING FOR MOTOR VEHICLES

BACKGROUND OF THE INVENTION

The invention relates to a hydraulic power steering for motor vehicles with a servovalve in the form of a rotary spool valve whose control parts, which are rotatable with respect to each other—the rotary spool sleeve and the rotary spool—are operatively interconnected by spring means consisting preferably of a torsion rod. The torsion rod seeks to retain the control components in a normal position relative to each other. The power steering also includes a steering gear arrangement which is operatively connected to a hydraulic servo motor arranged between one of the control parts and the vehicle steering wheel. The servomotor is controlled directly or indirectly by the control valve for the transfer of forces to the vehicle steering wheels.

Such power steering arrangements are generally known and are installed in production motor vehicles. The power steering includes a steering control element, that is, generally a steering wheel which is operatively connected to one of the control parts so that a torque effective between the steering wheel and the steering gear arrangement leads to relative rotational movement between the control parts whereby the hydraulic servomotor is so operated that it generates a servo force in support of the respective steering wheel movement whereby the force to be applied to the steering control element, that is, the steering wheel is reduced.

With these known power steering arrangements, a firm mechanical connection is provided between the steering control element, that is the steering wheel, and the steered wheels.

It is also known basically to operate, with the control element, only a setting means which then cooperates via a control circuit with a servomotor whose control actions are adjusted by a set value and actual position comparison so that the control actions essentially correspond to the movement of the control element. Such control concepts with electronic control circuits are used for example in airplanes for the operation of the wing flaps, the elevators and the rudders. These control arrangements which are also called "fly-by-wire" controls have achieved in the meantime such a good safety record that they are used not only in military aircraft, but also in commercial passenger airplanes.

It is the object of the present invention to utilize such a concept also for motor vehicles and utilize it with as many proven parts of conventional power steering arrangements as possible.

SUMMARY OF THE INVENTION

In a hydraulic power steering for motor vehicles having a steering control element, a position setting unit connected to the steering control element, a control motor connected to the position setting unit by way of a control circuit and a servo valve having control parts which are supported so as to be rotatable relative to each other but operatively interconnected by spring means retaining them in a central open position relative to each other, one of the control parts is operatively connected to the control motor and the other is connected to a steering gear mechanism associated with the steered wheels of the motor vehicle, and a hydraulic servomotor is associated with the vehicle wheel steering mechanism and hydraulically connected to the servo valve to receive hydraulic fluid therefrom depending on the relative rotary positions of the servo valve control parts.

The invention basically eliminates the positive mechanical coupling of the control element, that is, the steering wheel, and steered vehicle wheels. In one embodiment, a remote control motor is operated by the control element or the steering wheel and a control circuit and the control motor is connected to the other control part of the control valve and also to the steered vehicle wheels which are steered by the control movement of the control motor. When relatively large moments are to be transmitted between the control-motor and the steered vehicle wheels, the servo valve is actuated and the servomotor is utilized to support the movement of the control motor. Consequently, in this embodiment, the control motor is, just like the steering wheel in conventional power steering systems, coupled to the steered vehicle wheels so that essential parts of the power steering system according to the invention, are of the same design as those of conventional power steering systems. However, the steering column of conventional steering systems is omitted so that substantially less installation space is required. At the same time, there is no need for the multitude of friction-causing bearings needed in conventional power steering systems.

In another embodiment of the invention, a control motor is arranged between the control parts of the servo valve such that the control parts are movable relative to each other and, as a result, the servo motor is moved in one or the opposite direction corresponding to the control movement of the control element or the steering wheel.

In a particularly advantageous embodiment of the invention, both alternative embodiments are utilized at the same time. In this case, two separate control motors are employed.

Of these, the first one which is connected only to a control part of the servo valve is utilized to perform "normal" steering movements in accordance with the control set point provided by the control element, that is the steering wheel.

The second control motor, on the other hand, which can only provide for relative rotation between the control parts of the servo valve is used mainly for steering corrections of an independent steering system of the vehicle, for example for steering corrections required as a result of cross wind influences or because of skidding movements of the vehicle. Only upon failure of the first control motor, the second control motor is utilized for normal steering maneuvers.

The first control motor is preferably an electric motor and the second control motor is preferably a hydraulic control unit.

Various features of the invention are described below on the basis of the accompanying drawings which show preferred embodiments of the invention.

DESCRIPTION OF THE PREFERRED EMBODIMENTS

Figure 1:
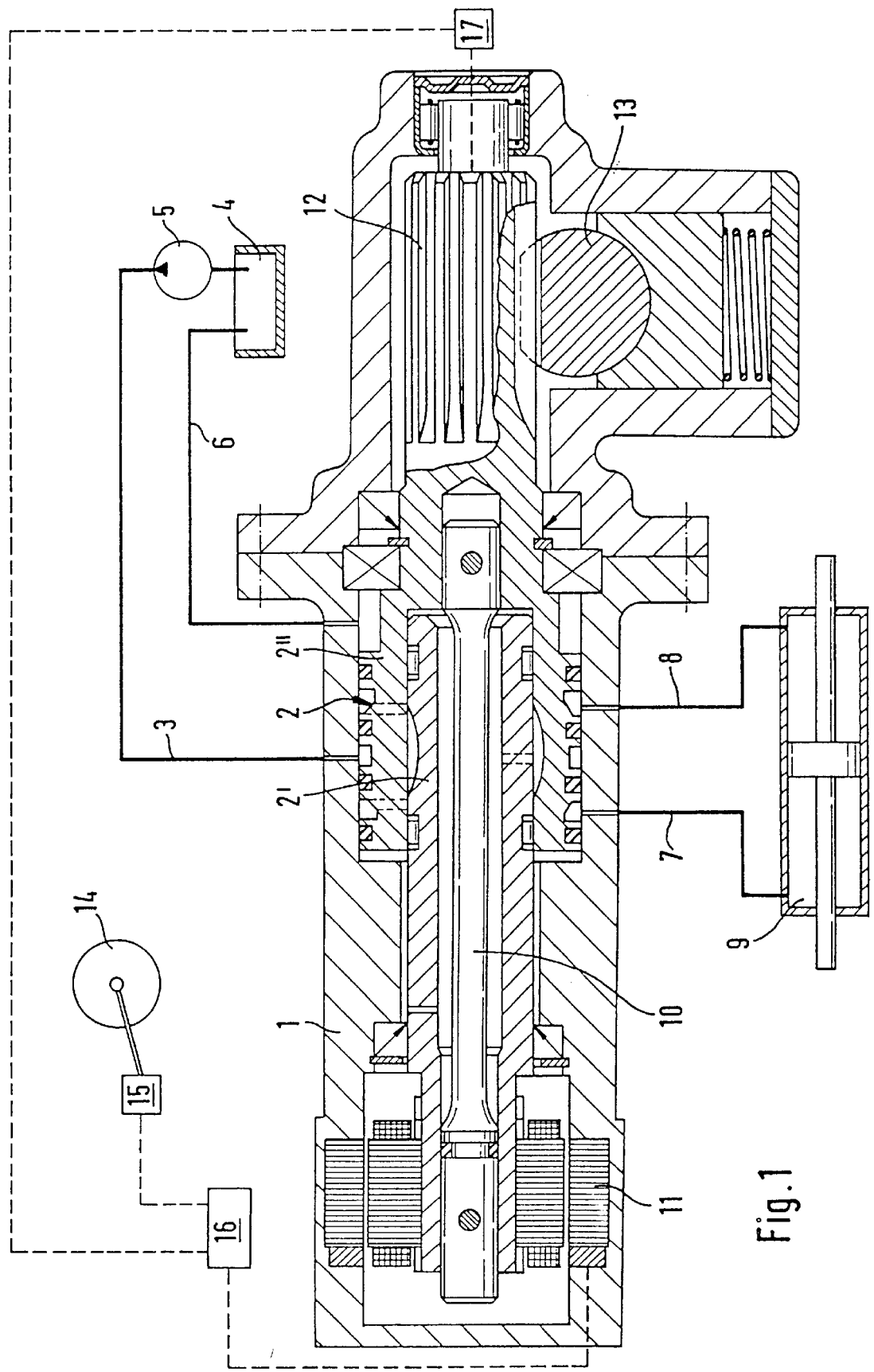
FIG. 1 is a cross-sectional of a first embodiment of the invention wherein an electric control motor operates the steering mechanism utilizing an intermediate servo valve arrangement.

In accordance with FIG. 1, a housing includes a conventional servo valve 2 which is a rotary spool valve comprising essentially a rotary spool part 2' and a rotary sleeve part 2". The servo valve 2 is provided with a pressure connection 3 which is in communication with the pressure side of a servo pump 5 whose suction side is in communication with a hydraulic fluid reservoir 4. In addition, the servo valve 2 is provided with a low pressure connection 6, which is in communication with the reservoir 4. The servovalve is further in communication with two motor connections 7 and 8, which lead to opposite sides of a double acting piston cylinder unit serving as a servo motor 9.

The servo valve 2 has a so-called open center section wherein all connections 3 and 6–8 are in communication with each other when the rotary spool part 2' and the rotary sleeve part 2" are in their center position relative to each other. If the rotary spool part 2' and the rotary sleeve part 2" are rotated out of their relative center positions in either direction a controllable pressure difference in one or the other direction is generated between the motor connections 7 and 8 if the servo pump 5 is operating. As a result the servo motor 9 generates a correspondingly large adjustment force in one or the opposite direction.

The rotary spool part 2' and the rotary sleeve part 2" are interconnected by a torsion rod 10 extending through an axial bore formed in the rotary spool part 2' and resiliently retaining the two parts 2' and 2" in their relative center positions.

As shown in FIG. 1, an electric motor 11 is provided at the left side end of the rotary spool part 2' where it is mounted in the housing 1. By appropriate energization of the electric motor 11 the rotary spool part 2' and the torsion rod end connected thereto and, by way of the torsion rod 10, also the rotary sleeve 2" can be rotated in one or the opposite direction.

However, the rotary sleeve 2" is provided, at its right end, with a pinion 12 which is in engagement with a rack 13 of a rack and pinion gear which is connected to the steered wheels of a vehicle for controlling the steered wheels (which are not shown) in a well known manner by moving the rack 13 axially corresponding to the rotation of the pinion 12. The rack 13 is operatively connected to the servo motor 9 either directly or indirectly so that the rack 13 and the piston of the servomotor 9 are movable together in one or the opposite direction.

Operation of the arrangement according to FIG. 1:

By the steering wheel 14 of a driver operated vehicle a position setting unit 15 is operated whose signals provide a set value for the steering angle of the steered vehicle wheels which set value is supplied to the input side of a control circuit 16. The control circuit 16 compares the set value with the actual value which is determined by means of an actual value sensor 17 which cooperates with a steering gear component that is directly connected to the steered vehicle wheels such as the pinion 12 and/or the rack 13. Depending on the result of the comparison between the set value and the actual value the control circuit 16 energizes the electric motor 11 such that the electric motor is rotated in one or the opposite direction depending on the steering angle change to be accomplished. Depending on the torque effective between the electric motor 11 and the pinion 12 the rotary spool part 2' and the rotary sleeve part 2" are more or less rotated relative to each other against the force of the torsion rod 10 whereby a corresponding pressure difference is generated at the motor connections 7 and 8 so that the servo motor 9 aids the control movement of the electric motor with a force corresponding to the torque generated by the electric motor. The embodiment of FIG. 2 differs from that of FIG. 1 in that, instead of the electric motor 11, a hydraulic motor is utilized. For this purpose, the housing 1 includes an annular space 18 having a circumferential inner wall formed by a cylindrical axial portion of the rotary spool valve part 2' and the inner wall of the housing 1. This annular space 18 is divided into two annular chambers by an axially movable annular piston 19. The piston 19 has a cylindrical extension 20 which has at its inner side as well as at its outer side grooves and webs which extend in an oblique manner with respect to each other. These grooves and webs are engaged by corresponding webs and grooves formed, at one side, in an axial section at the outer circumference of the rotary spool part 2' and, at the other side, on the inner circumference of the rotary sleeve part 2". Since the webs and grooves on the outer surface of the cylindrical extension 20 are at an oblique angle with respect to the grooves and webs on the inner surface of the extension 20, the extension 20 and together therewith the annular piston 19 are moved axially when the rotary spool part 2' and the rotary sleeve part 2" are rotated relative to one another. Conversely, the parts 2' and 2" are rotated in opposite directions with respect to each other when the annular piston 19 is axially moved in one or the opposite direction.

The annular chambers formed by the annular piston 19 in the annular space 18 can be connected by way of conduits 21, 22 and a control valve 24 to a pump 25 and to a hydraulic fluid reservoir 4 so that a particular pressure difference between the annular chambers at opposite sides of the piston 19 can be generated in the annular space 18 with a respective operation of the control valve 25 for movement of the piston 19 in one or the opposite direction. The axial movement of the piston 19 results in a relative rotary movement of the rotary spool part 2' and the rotary sleeve part 2" whereby the servo valve 2 is controlled so as to provide a pressure difference between the motor connections 7 and 8 of the servo motor 9. In this way the servo motor is actuated to make a control move by which the vehicle steering and the rack 13 are adjusted.

Figure 2:
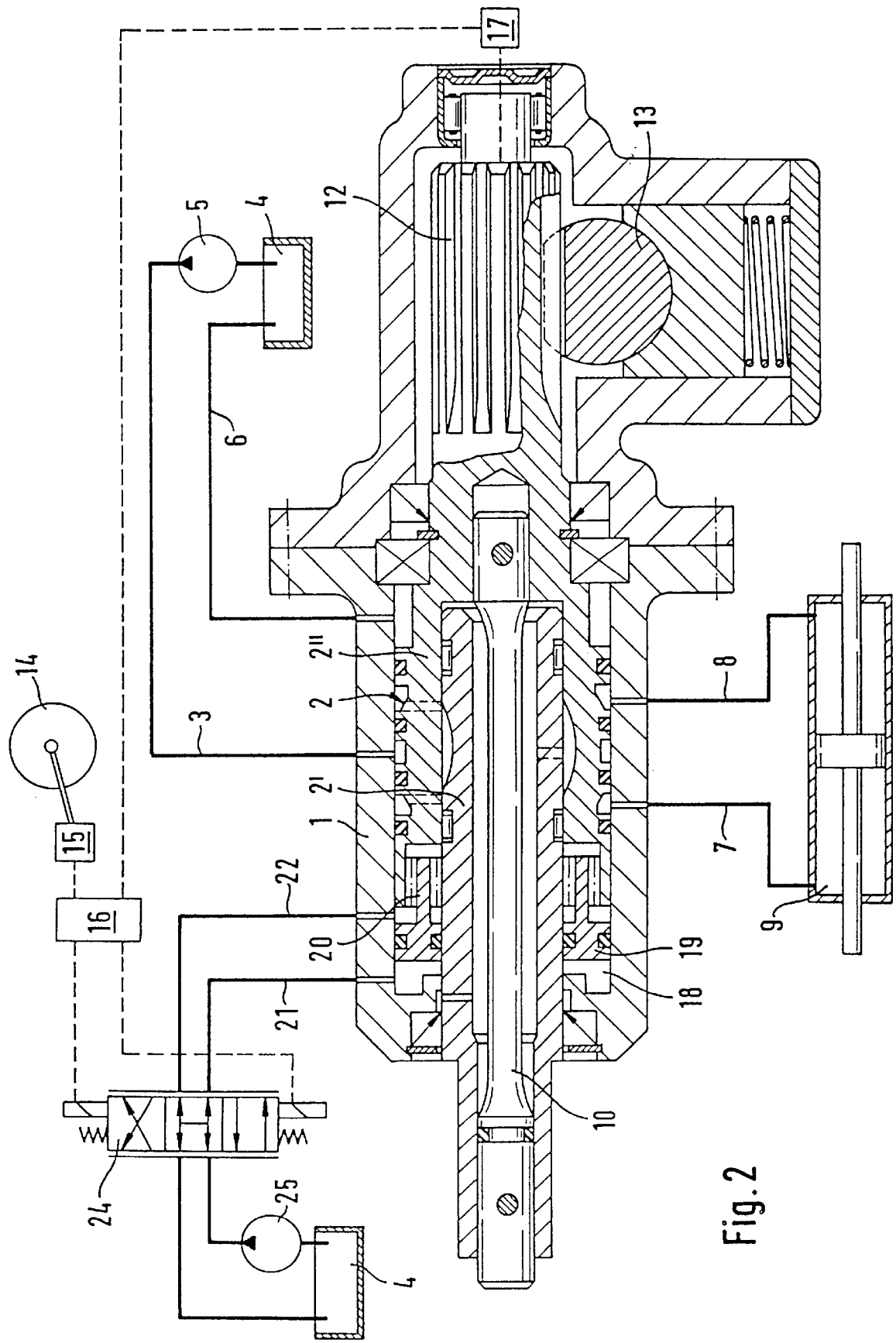
FIG. 2 is a corresponding cross-sectional view of a modified arrangement wherein a hydraulic control motor is utilized for operating the steering mechanism and the wheels of the vehicle with the aid of an intermediate servo valve and servo motor.

Operation of the arrangement according to FIG. 2:

The position setting unit 15 which is operated by the steering wheel 14 provides a set value for the steering angle for the steered vehicle wheels. The control circuit 16 compares the set value with the actual value provided by the actual value provided by the actual value sensor 17 and operates the valve 24 depending on the deviation of the set value from the actual value. Depending on the direction of the set value—actual value deviation, the control valve 24 is actuated in one or the opposite direction with the result that the annular piston 19 is moved in one or the opposite direction. This generates more or less pressure difference at the motor connections 7 and 8 so that the servomotor 9 executes a steering action to compensate for the set value actual—value deviation.

Figure 3:
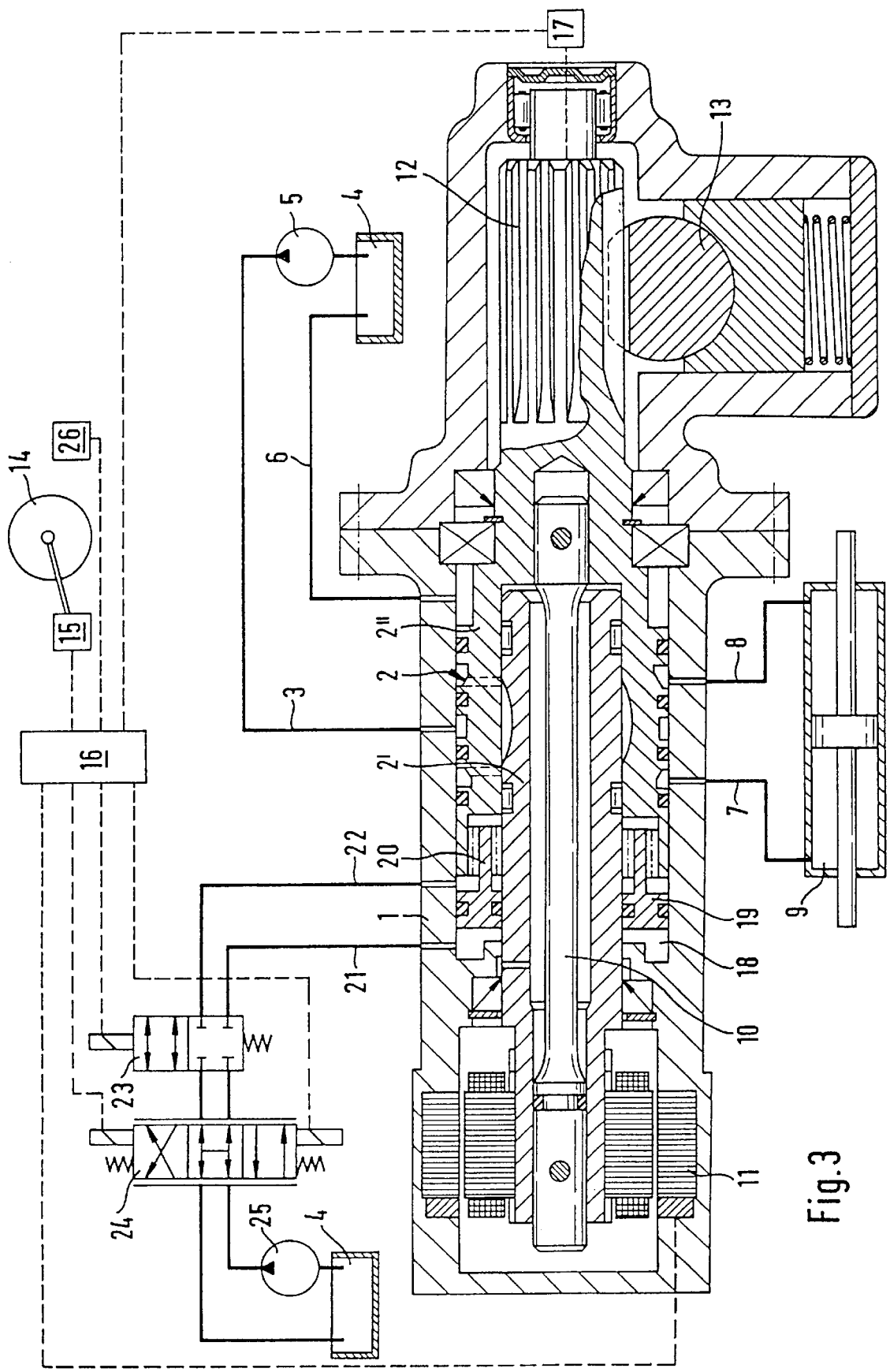
FIG. 3 is a corresponding cross-sectional view of another embodiment wherein the control capabilities of the FIG. 1 and FIG. 2 arrangements are combined.

In the embodiment according to FIG. 3 both control possibilities of the servo valve 2 according to FIGS. 1 and 2 are provided. The embodiments according to FIG. 3 operates as follows:

The control circuit 16 again compares the set value provided by the position setting unit 15 connected to the steering wheel 14 with the actual value provided by the actual value sensor 17 and controls the electric motor 11 so as to compensate for the set value—actual value deviation.

The control circuit 16 is further connected to additional sensors 26 which recognize special driving situations for example cross-wind forces or yawing motions of the vehicle. Depending on the signals from these sensors, the control circuit can then initiate special steering maneuvers and operate the control valves 23 and 24 in such a way that the annular piston 19 executes a control movement which leads to a (possibly additional) adjustment of the servo valve 2 and, consequently, a changed adjustment force of the servomotor 9.

It is basically, possible that, upon failure of the electric motor 11 the vehicle steering can still be operative by appropriate control of the valves 23 and 24 in accordance with the explanation given above with respect to FIG. 2. By the redundancy provided hereby the safety of the system is substantially increased.

What is claimed is:

1. A hydraulic power steering for motor vehicles comprising: a steering control element, a position setting unit connected to said steering control element so as to be settable thereby, a first control motor connected to said position setting unit by way of a control circuit to be operated thereby, a servo valve having two control parts which are supported so as to be rotatable with respect to each other but are operatively coupled by spring means adapted to retain the control parts in a central rest position with respect to each other, one of said control parts being operatively connected to said first control motor to be rotated thereby depending on set values provided by said steering control element and the other control part being connected to a steering gear mechanism which is connected to steered wheels of the motor vehicle, and a hydraulic servo motor arranged to aid the movement of said steering gear mechanism and being connected to said servo valve so as to receive hydraulic fluid therefrom depending on the relative rotary positions of said servo valve control parts and a second control motor effective to displace said two servo valve parts relative to each other for executing automatic steering corrections.

2. A power steering according to claim 1, wherein said first control motor is an electric motor.

3. A power steering according to claim 1, wherein said first control motor is a hydraulic displacement member which is operatively coupled with said servo valve control parts so as to rotate the control parts relative to each other when said hydraulic displacement member is axially displaced.

4. A power steering according to claim 1, wherein said servo valve has a center position in which said servo motor is not actuated.

* * * * *